(12) United States Patent
Wang et al.

(10) Patent No.: US 9,866,538 B2
(45) Date of Patent: Jan. 9, 2018

(54) DATA DECRYPTION CIRCUIT AND ASSOCIATED METHOD

(71) Applicant: MStar Semiconductor, Inc., Hsinchu Hsien (TW)

(72) Inventors: Yii-Kai Wang, Zhubei (TW); Te-Chuan Wang, Zhubei (TW)

(73) Assignee: MStar Semiconductor, Inc., Hsinchu, Hsien (TW)

( * ) Notice: Subject to any disclaimer, the term of this patent is extended or adjusted under 35 U.S.C. 154(b) by 150 days.

(21) Appl. No.: 14/548,479

(22) Filed: Nov. 20, 2014

(65) Prior Publication Data
US 2015/0143109 A1 May 21, 2015

(30) Foreign Application Priority Data
Nov. 21, 2013 (TW) .............. 102142446 A

(51) Int. Cl.
*H04L 29/06* (2006.01)
(52) U.S. Cl.
CPC ................ *H04L 63/0457* (2013.01)
(58) Field of Classification Search
CPC .................. H04L 63/0457; H04L 63/045
See application file for complete search history.

(56) References Cited

U.S. PATENT DOCUMENTS

| 2004/0184479 A1* | 9/2004 | Yamauchi | H04L 69/08 370/466 |
| 2005/0262573 A1* | 11/2005 | Bo | G06F 21/10 726/27 |
| 2007/0139225 A1* | 6/2007 | Lee | G06F 1/1626 341/22 |
| 2008/0259962 A1 | 10/2008 | Mori et al. | |
| 2012/0082435 A1* | 4/2012 | Kimura | G11B 27/105 386/259 |

FOREIGN PATENT DOCUMENTS

CN   1324381   7/2007

OTHER PUBLICATIONS

Taiwan Office Action, dated Jul. 21, 2015, 7 pages.
SIPO Office Action, dated Jul. 4, 2017, 8 pages.

* cited by examiner

*Primary Examiner* — Ghodrat Jamshidi
(74) *Attorney, Agent, or Firm* — Edell, Shapiro & Finnan, LLC

(57) ABSTRACT

A data decryption circuit for decrypting a current encrypted data packet is provided. The current encrypted data packet includes a header and a payload. The data decryption circuit includes an operation unit and a decryption calculation unit. The operation unit generates first data according to the header and a pseudo-random number, second data according to a session key and a constant, and length information and start position information of the payload according to the header. The operation unit generates the first data, the second data, the length information and the start position information by executing a program code. The decryption calculation circuit, coupled to the operation unit, generates a decryption key according to the first and second data, retrieves the payload from the current encrypted data packet according to the start position information and the length information, and decrypts the payload by the decryption key.

18 Claims, 3 Drawing Sheets

DATA DECRYPTION CIRCUIT AND ASSOCIATED METHOD

This application claims the benefit of Taiwan application Serial No. 102142446, filed Nov. 21, 2013, the subject matter of which is incorporated herein by reference.

BACKGROUND OF THE INVENTION

Field of the Invention

The invention relates in general to a data decryption circuit and an associated method, and more particularly, to a data decryption circuit that utilizes both software and hardware and a method thereof.

Description of the Related Art

FIG. 1 shows a schematic diagram of a High-bandwidth Digital Content Protection (HDCP) data decryption process. FIG. 2 shows a schematic diagram of a conventional transport stream (TS) packet. As shown in FIG. 2, a TS packet 200 includes a TS header, a packetized elementary stream (PES) header, and an elementary stream (ES), or referred to as a payload. In the HDCP standard, the TS header includes a flag named as a payload unit start indicator for indicating whether a TS packet includes a PES header. The PES header includes private data, which is utilized for decryption and mainly includes streamCtr data and inputCtr data. It should be noted that, not all TS packets include the PES header. Whether a TS packet includes the PES header is determined according to the payload unit start indicator flag. When a TS packet includes the PES header, the inputCtr data may be retrieved from the private data to perform a decryption process. When a TS packet does not include the PES header, the inputCtr data may be concluded according to a data block (e.g., 16 bytes) currently being decrypted since the inputCtr data increases by a unit of a data block of the HDCP data decrypted each time. Referring to FIG. 1, an exclusive or (XOR) operation is performed on the 32-bit streamCtr and the lower 32 bits of the 64-bit pseudo-random number $r_{iv}$, and a result of the XOR operation is combined with the higher 32 bits of the pseudo-random number $r_{iv}$, to retrieve 64-bit intermediate data, which is then combined with the 64-bit inputCtr data to form 128-bit intermediate data p. An XOR operation is performed on a 128-bit session key $K_s$ and a 128-bit constant $I_{C128}$, and an advanced encryption standard (AES) operation is performed on a result of the XOR operation and the intermediate data p to generate a 128-bit key. By performing an XOR operation on the encrypted data of one data block length (128 bits or 16 bytes) and the key, original data of the encrypted data (including 128-bit or 16-byte data) can be retrieved. The pseudo-random number $r_{iv}$, and the session key $K_s$ are results of communications between a transmitter and a receiver of TS data.

As shown in FIG. 2, the length of one TS packet is 188 bytes, with the length of the TS header being 4 bytes, and the PES data being present or absent and having no fixed length. As previously described, whether the PES header is present can be determined by the payload unit start indicator flag. If the PES header is present, the PES header includes length information of the PES header itself. Therefore, the length of the payload is the remaining data length of the length of the TS packet (188 bytes) minus the length of the TS header (4 bytes) and the length of the PES header (if present). As previously stated, the data block of HDCP data decrypted each time is 16 bytes, the payload may include several data blocks, and the amount of data of the payload may not be an integral multiple of 16 bytes. As a result, in a data decryption process, a small segment of residual data (less than 16 bytes) may be remained from one TS packet. Such residual data yet to be decrypted is combined with a part of the data of the payload in a next TS packet to form a complete data block that can then be processed by an HDCP data decryption process.

If the HDCP decryption process in FIG. 1 is entirely performed by hardware, due to the lack of flexibilities in hardware, the combining process for the payloads originally belonged to two different TS packets inevitably causes hardware design complications that need to be handled by additional circuit designs, leading to increases in design time and circuit costs. If the HDCP decryption process is entirely performed by software, i.e., by an operation unit through executing a program code, the HDCP decryption process may consume excessive resources of the operation unit and increase the load on the operation unit, hence much likely degrading performance of an electronic device.

SUMMARY OF THE INVENTION

The invention is directed to a data decryption circuit and a data decryption method for accelerating a decryption speed and increasing flexibilities of a decryption process.

The present invention discloses a data decryption circuit for decryption a current encrypted data packet. The current encrypted data packet includes a header and a payload. The data decryption circuit includes an operation unit and a decryption calculation unit. The operation unit generates first data according to the header and a pseudo-random number, second data according to a session key and a constant, and length information and start position information of the payload according to the header. The operation unit generates the first data, the second data, the length information and the start position information through executing a program code. The decryption calculation circuit, coupled to the operation unit, generates a decryption key according to the first and second data, retrieves the payload from the current encrypted data packet according to the start position information and the length information, and decrypts the payload by using the decryption key.

The present invention further discloses a data decryption method for decrypting a current encrypted data packet. The current encrypted data packet includes a header and a payload. The data decryption method includes: by an operation unit through executing a program code, performing processes of: 1) generating first data according to the header and a pseudo-random number; 2) generating second data according to a session key and a constant; and 3) generating length information and start position information of the payload according to the header; transmitting the first data, the second data, the length information and the start position information to a decryption calculation circuit; and controlling the decryption calculation circuit to perform processes of: 1) generating a decryption key according to the first data and the second data; 2) retrieving the payload from the encrypted data packet according to the start position information and the length information; and 3) decrypting the payload with the decryption key.

The present invention further discloses a data decryption circuit for decrypting a current encrypted data packet. The current encrypted data packet includes a header and a payload. The data decryption circuit includes an operation unit and a decryption calculation circuit. The operation unit generates length information and start position information of the payload according to the header through executing a program code. The decryption calculation circuit, coupled to the operation unit, generates a decryption key, retrieves the payload from the current encrypted data packet according to the start position information and the length information, and decrypts the payload with the decryption key.

The present invention further discloses a data decryption method for decrypting a current encrypted data packet. The current encrypted data packet includes a header and a payload. The data decryption method includes: controlling an operation unit to generate length information and start position information of the payload according to the header through executing a program code; transmitting the length information and the start position information to a decryption calculation circuit; and controlling the decryption calculation circuit to perform processes of: 1) generating a decryption key; 2) retrieving the payload from the current encrypted data packet according to the start position information and the length information; and 3) decrypting the payload with the decryption key.

The data decryption circuit and the data decryption method of the present invention perform data decryption by incorporating both software and hardware. The software features advantages of having high flexibilities and being easily modifiable, so that designs of the software may be adjusted according to different formats of encrypted data packets to easily identify a position of a payload in an encrypted data packet. The hardware is capable of accelerating the decryption process to complete the decryption process in a shorter period of time and thus enhance circuit performance. Although a conventional solution of performing a decryption process entirely by software features high flexibilities, the software may excessively consume resources of an operation unit and also cause a large load on an embedded system having limited hardware resources (e.g., an operation speed of the operation unit is slower). Further, in the prior art, the solution of performing a decryption process entirely by hardware lacks flexibilities although having a faster decryption speed, and easily causes errors when encountering a payload of an encrypted data packet that is a non-integral multiple of a smallest decryption unit. Compared to the prior art, the present invention, possessing advantages of both software and hardware, is capable of quickly completing a decryption process while offering flexibilities.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definitions of the terms are based on the description or explanation of the application.

The present invention discloses a data decryption circuit and a data decryption method capable of processing a payload having a data length that is a non-integral multiple of a data block. The circuit and method are applicable to transport stream (TS) packets. In possible implementation, one skilled person in the art may choose equivalent elements or steps to implement the disclosure based on the disclosure of the application. That is, the implementation of the disclosure is not limited in the embodiments disclosed in the disclosure. Further, a part of the elements included in the signal processing device of the disclosure are individually known elements. Without affecting the full disclosure and possible implementation of the device, details of the known elements are omitted. Further, the data decryption method of the disclosure may be implemented by the data decryption circuit of the disclosure or an equivalent device. Without affecting the full disclosure and possible implementation of the method of the disclosure, the description of the method focuses on the steps of the method instead of hardware.

Figure 1:
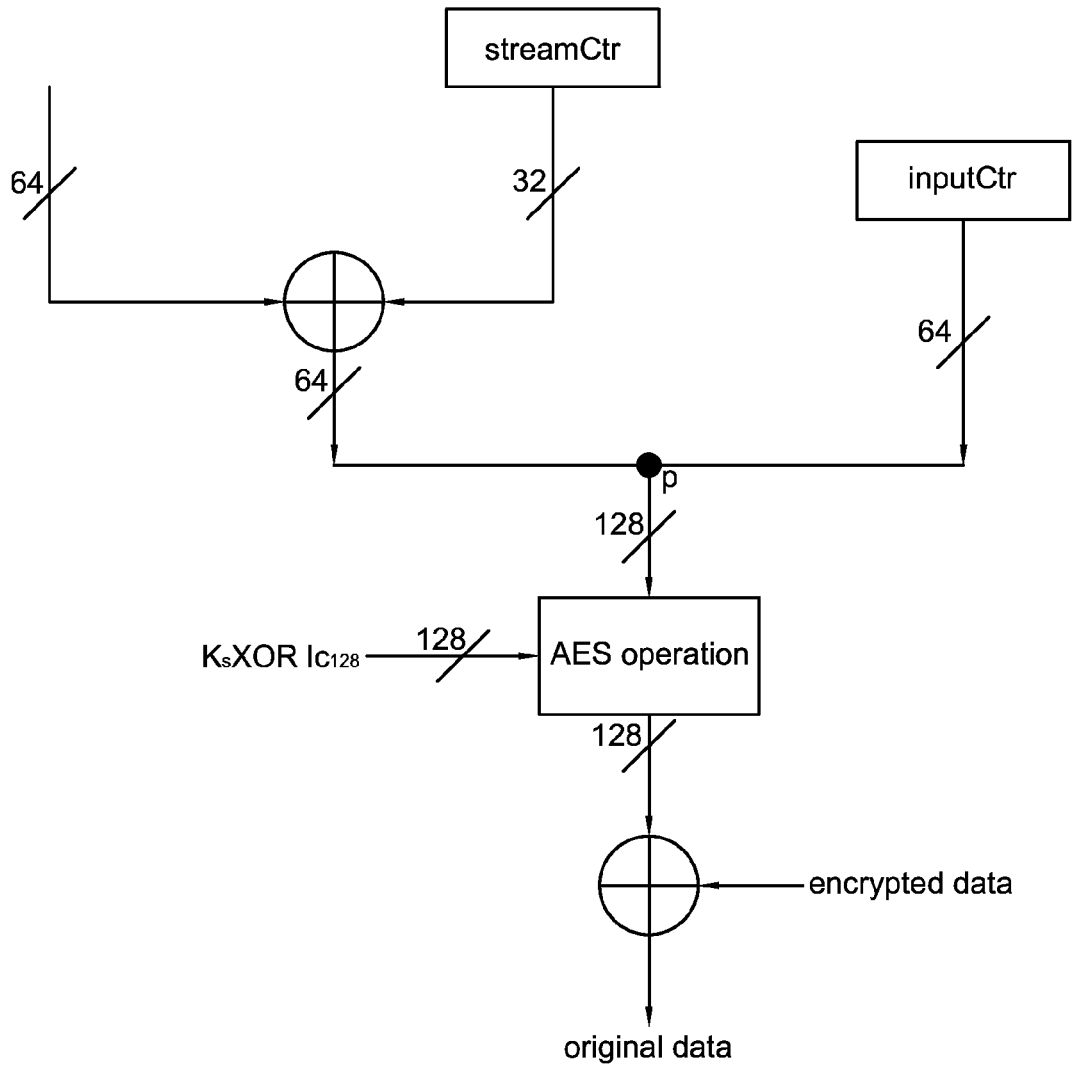
FIG. 1 is a schematic diagram of a conventional HDCP data decryption process.
Figure 2:
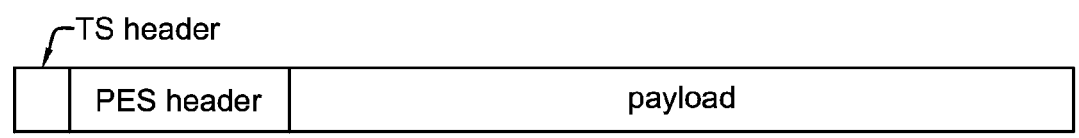
FIG. 2 is a schematic diagram of a conventional transport stream (TS) packet.
Figure 3:
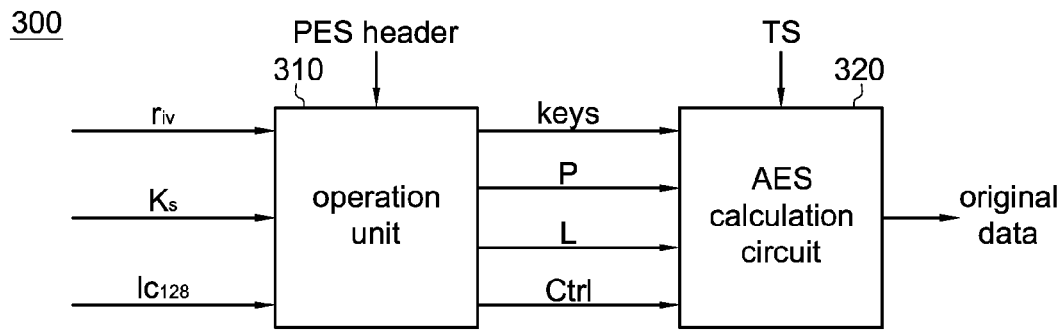
FIG. 3 is a schematic diagram of an HDCP data decryption circuit according to an embodiment of the present invention.

FIG. 3 shows a schematic diagram of a High-bandwidth Digital Content Protection (HDCP) data decryption circuit according to an embodiment of the present invention. An HDCP data decryption circuit 300 is for decrypting consecutive TS packets, and includes an operation unit 310 and an advance encryption standard (AES) calculation circuit 320. The operation unit 310 retrieves a packetized elementary stream (PES) header, parses the PES header to retrieve streamCtr data and inputCtr data, and performs an exclusive or (XOR) operation on and combines the streamCtr data, the input Ctr data and a pseudo-random number $r_{iv}$ to retrieve intermediate data p shown in FIG. 1. The operation unit 310 further performs an XOR operation on a session key $K_s$ and a constant $I_{C128}$ to generate intermediate data q. The intermediate data p and the intermediate data q are combined to form a key keys that is then outputted to the AES calculation circuit 320. Further, when the TS packet includes the PES header, the operation unit 310 further parses the PES header to retrieve length information of the PES header. According to the length information of the PES header, the operation unit 310 calculates a start position P and a length L of a payload in the TS packet 200 in FIG. 2. More specifically, the TS packet 200 has a fixed length of 188 bytes, and the TS header of the TS packet 200 also has a fixed length of 4 bytes. Assuming that the length of the PES header is n byte(s) (where n is an integer, which equals 0 if the PES header is absent), the start position P of the payload is the $(4+n+1)^{th}$ byte, and the length L of the payload is (188−4−n) bytes. After retrieving the start position P and the length L of the payload, the operation unit 310 transmits such information to the AES calculation circuit 320. Having outputted the key keys and the information of the start position P and the length L of the payload to the AES calculation circuit 320, the operation unit 310 sends out a control signal Ctrl to trigger a decryption process of the AES calculation circuit 320.

The AES calculation circuit 320 is a circuit that supports multiple encryption algorithms, and includes an AES-CTR module applicable to the HDCP data decryption operation of the present invention. The AES-CTR module performs an operation on the intermediate data p and the intermediate data q in the key keys to retrieve a 128-bit final key that is used for decrypting encrypted data. According to the start position P and the length L of the payload, the AES calculation circuit 320 retrieves the data block to be decrypted from the TS packet, and performs an XOR operation on the data block to be decrypted and the final key to retrieve unencrypted original data. When the payload included in the current TS packet exceeds the length of one data block (i.e., 16 bytes), the AES calculation circuit 320 continues decrypting a next adjacent data block after having decrypted the current data block. If the payload included in the current TS packet is an integral multiple of 16 bytes, the AES circuit continues decrypting a next TS packet after having decrypted all data blocks of the payload of the current TS packet. On the other hand, if the payload included in the current TS packet is a non-integral multiple of 16 bytes, i.e., data less than 16 bytes is remained in the decryption process of the current payload data, the AES calculation circuit 320 may retrieve a part of data of the payload of the next TS packet according to the start position P and the length L of the payload of the next TS packet provided by the operation unit 310, and combine the part of data with the remaining data of the payload of the last TS packet to form a 16-byte data block for decryption. In conclusion, even if a payload having a data length less than 16 bytes occurs during the decryption process, the HDCP data decryption circuit 300 of the present invention is still capable of continuing the decryption process without causing any errors. It should be noted that, the operation unit 310 may be operated through executing a program code, and the AES calculation circuit 320 may be a hardware calculation circuit. As such, the present invention may complete the decryption process with the cooperation of software and hardware.

Figure 4:
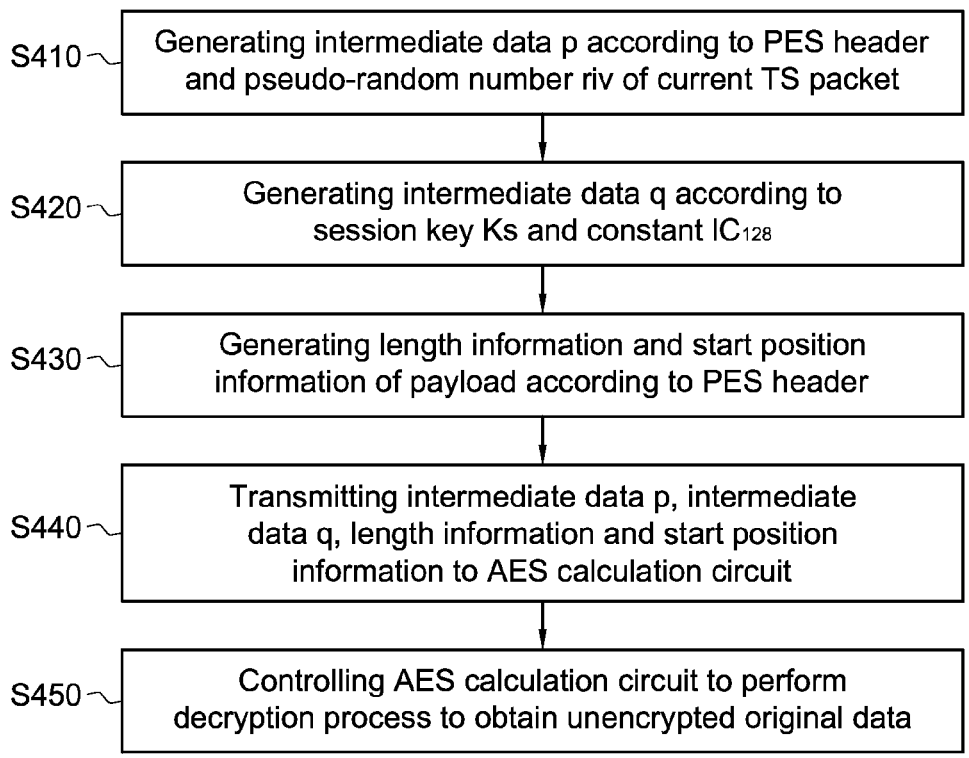
FIG. 4 is a flowchart of a data decryption method according to an embodiment of the present invention.

FIG. 4 shows a flowchart of a data decryption method according to an embodiment of the present invention. In addition to the data decryption circuit, the present invention correspondingly discloses data decryption method for decrypting TS packets. The data decryption method is capable of decrypting TS packets including payloads of different lengths. In the method, an AES-CTR encryption algorithm required in an HDCP data decryption process is handled by an AES calculation circuit. The data decryption method may be performed by the foregoing HDCP data decryption circuit 300 or an equivalent device. Further, the data decryption method of the present invention is used for decrypting consecutive TS packets, including a current TS packet that is currently being decrypted and a next TS packet subsequently adjacent to the current TS packet. Each of the current TS packet and the next TS packet includes a PES header and a payload. Referring to FIG. 4, the data decryption method according to an embodiment of the present invention includes following steps.

In step S410, intermediate data p is generated according to the PES header of the current TS packet and a pseudo-random number $r_{iv}$. This step is implemented by software. More specifically, this step is completed by an operation unit of an electronic device through executing a program code. The PES header includes private data for decryption. The private data mainly includes streamCtr data and inputCtr data. In this step, an operation is performed on the streamCtr data, the inputCtr data and the pseudo-random number to retrieve the intermediate data p. Details of the operation are as disclosed in the foregoing description, and shall be omitted herein.

In step S420, intermediate data q is generated according to a session key $K_s$ and a constant $I_{C128}$. This step is also implemented by software. That is, this step is completed by an operation unit in an electronic device through executing a program code. The session key $K_s$ and a constant $I_{C128}$ are necessary data for the decryption process. Details for generating the session key $K_s$ and a constant $I_{C128}$ are generally known to one person skilled in the art, and shall be omitted herein. Further, details of the operation performed on the session key $K_s$ and a constant $I_{C128}$ for generating the intermediate data q are also disclosed in the foregoing description, and shall be omitted herein.

In step S430, length information and start position information of the payload is generated according to the PES header. This step is similarly implemented by software. That is, this step is completed by an operation unit in an electronic device through executing a program code. As shown in FIG. 2, the TS packet processed by the method has a fixed length, and includes the TS header, the PES header and the payload. The TS header has a fixed length, and the PES header has a variable length and includes length information of the PES header. Therefore, according to the length information in the PES header, the start position information and the length information of the payload can be retrieved.

In step S440, the intermediate data p, the intermediate data q, the length information and the start position information are transmitted to the AES calculation circuit. In this step, the intermediate data p, the intermediate data q, the length information and the start position information required for decryption are transmitted to the AES calculation circuit.

In step S450, the AES calculation circuit is controlled to perform following processes.

1) A decryption key is generated according to the intermediate data p and the intermediate data q. The AES calculation circuit includes an AES-CTR module for performing an AES operation on the intermediate data and the intermediate data q to generate the final decryption key for decryption. Details of the operation are generally known to one skilled in the art, and shall be omitted herein.

2) The payload data is retrieved from the current TS packet according to the start position information and the length information. After retrieving the current TS packet, the AES calculation circuit retrieves the payload data of the current TS packet according to the start position information and the length information of the payload.

3) The payload is decrypted with the decryption key. After the AES calculation circuit performs an operation on the decryption key and the payload, the payload can be decrypted to retrieve unencrypted original data. Details of the operation are as disclosed in the foregoing description, and shall be omitted herein.

It should be noted that, the decryption process in step S450 performs operations in a unit of one data block. In a preferred embodiment, the length of one data block is set to be 16 bytes. One payload usually includes more than one data blocks. The AES calculation circuit continues decrypting the next data block after having decrypted one data block. For a payload that includes an integral number of data blocks, i.e., when the length of the payload is an integral multiple of 16 bytes, the AES calculation circuit can completely encrypt the entire payload without leaving any unencrypted data in the current TS packet. However, if the payload includes a non-integral multiple number of data blocks, i.e., when the length of the payload is a non-integral multiple of 16 bytes, residual data less than 16 bytes that is yet unencrypted inevitably remains in the current TS packet. At this point, the payload of a next TS packet of the current TS packet needs to be combined with the residual data to form a complete data block, which can then be decrypted. The start position information and the length information of the payload of the next TS packet are similarly retrieved by an operation unit of an electronic device through a software operation.

In the present invention, with software and hardware that cooperate with each other, the AES calculation circuit is able to retrieve an appropriate data block for decryption according to start position and length information provided by the operation unit. Thus, the AES calculation circuit may be designed to implement the decryption process entirely by hardware to accelerate the decryption process. Further, as the AES calculation circuit is not required to identify the payload of the TS stream, the hardware design can be kept simple. On the other hand, as the start position information and the length information of the payload are identified by software, the present invention features greater flexibilities. If the composition of TS packets is later changed, or the data processed by the present invention is not transmitted in a TS format, the present invention is still applicable to such variations by slightly modifying the program code.

Figure 5:
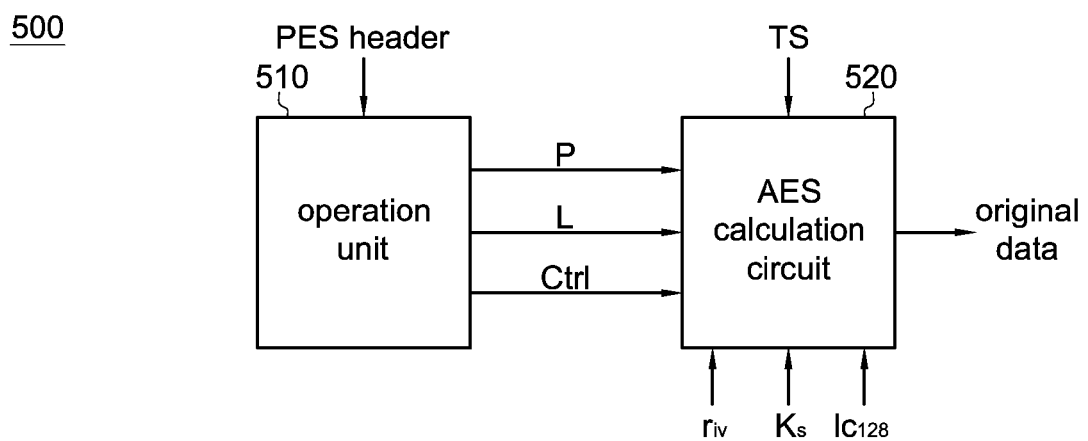
FIG. 5 is a schematic diagram of an HDCP data decryption circuit according to another embodiment of the present invention.

It should be noted that, an example of software cooperating with hardware for performing the decryption operation is given according to a preferred embodiment of the present invention. In other embodiments, the operation unit may perform less operation, and tasks originally completed by software may be implemented by increasing hardware of the AES calculation circuit. For example, FIG. 5 shows a schematic diagram of an HDCP data decryption circuit according to another embodiment of the present invention. An HDCP decryption circuit 500 includes an operation unit 510 and an AES calculation circuit 520. The AES calculation circuit 520 generates intermediate data p and intermediate q according to a pseudo-random number $r_{iv}$, a session key $K_s$ and a constant $I_{C128}$, and performs an operation on the intermediate data p and the intermediate data q to retrieve a final 128-bit decryption key. The operation unit 510 retrieves start position information P and length information L of the payload of the PES header, outputs such information to the AES calculation circuit 520, and sends a control signal Ctrl to trigger the decryption process of the AES calculation circuit 520. The decryption process of the AES calculation circuit 520 is identical to that of the device in the foregoing embodiment, and shall be omitted herein. Steps of the method of this embodiment are similar to those disclosed in the flowchart in FIG. 4. However, a difference of this embodiment from the previous embodiment is that, instead of being implemented by software, step S410 and step S420 are implemented by hardware controlled by the AES calculation circuit 520. Step S430 is sill implemented by software.

In other embodiments, there may be other configurations on hardware and software implementing tasks or steps of the decryption process. However, to maintain the flexibility and ability of decrypting payloads of different lengths, i.e., to process payloads having lengths that are non-integral multiples of a decryption data block (e.g., 16 bytes in the foregoing embodiments), the operation unit of the present invention needs to at least perform step S430, i.e., generating the length information and the start position information of the payload according to the PES header. Other tasks or steps may be flexibly configured and designed between software and hardware, and such variations are encompassed within the scope of the present invention.

One person skilled in the art can understand details and possible implementation variations of the method in FIG. 4 according to the disclosure of the device in FIG. 3. Without affecting the full disclosure and possible implementation, such repeated description is omitted herein. Further, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a TS packet is taken as an example in the foregoing embodiments, based on the disclosure of the present invention, one person skilled in the art may appropriately apply the present invention to encrypted data transmitted in other formats.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data decryption circuit for decrypting a current encrypted data packet, the current encrypted data packet comprising a first header and a payload, the data decryption circuit configured to:
   generate first data according to the first header and a pseudo-random number, generate second data according to a session key and a constant, combine the first data and the second data to form a key, generate length information and start position information of the payload according to the first header, generate a control signal to trigger decrypting; wherein the first data, the second data, the key, the length information, the position information and the control signal to trigger decrypting are generated through executing a program code;
   the decryption circuit comprising a decryption calculation circuit for generating a decryption key according to the key, retrieving the payload from the current encrypted data packet according to the start position information and the length information, and decrypting the payload with the decryption key,
   wherein the key, the length information, the position information and the control signal to trigger decrypting are received by the decryption calculation circuit, and wherein the control signal to trigger decrypting is received after the key, the length information, and the position information are received.

2. The data decryption circuit according to claim 1, wherein when the current encrypted data packet has a fixed length and further comprises a second header, the second header has a fixed length, the first header comprises header length information, and the decryption calculation circuit generates the length information and the start position information of the payload according to the header length information.

3. The data decryption circuit according to claim 1, wherein the decryption calculation circuit decrypts a part of the payload by a predetermined data length each time the calculation circuit decrypts the payload.

4. The data decryption circuit according to claim 3, wherein the current encrypted data packet is adjacently followed by a next encrypted data packet; when an unencrypted part of the payload is less than the predetermined length, the decryption calculation circuit generates and decrypts data to be decrypted matching the predetermined data length according to the payload of the current encrypted data packet, a payload of the next encrypted data packet and a start position information of the payload of the next encrypted data packet.

5. The data decryption circuit according to claim 1, wherein a decryption process of the decryption calculation circuit is compliant to High-bandwidth Digital Content Protection (HDCP) specifications.

6. The data decryption circuit according to claim 1, wherein the encrypted data packet is a transport stream (TS) packet.

7. A data decryption method, for decrypting a current encrypted data packet, the current encrypted data packet comprising a first header and a payload, the data decryption method comprising:
  executing a program code to perform operations of:
  generating first data according to the first header and a pseudo-random number;
  generating second data according to a session key and a constant;
  combining the first data and the second data to form a key;
  generating length information and start position information of the payload according to the first header;
  generating a control signal to trigger decrypting;
  transmitting the key, the length information, the start position information and the control signal to trigger decrypting to a decryption calculation circuit; and
  controlling the decryption calculation circuit to perform operations of:
  generating a decryption key according to key;
  controlling the decryption circuit to retrieve the payload from the current encrypted data packet according to the start position information and the length information; and
  controlling the decryption circuit to decrypt the payload with the decryption key,
  wherein the key, the length information, the position information and the control signal to trigger decrypting are received by the decryption calculation circuit, and wherein the control signal to trigger decrypting is received after the key, the length information, and the position information are received.

8. The data decryption method according to claim 7, wherein when the current encrypted data packet has a fixed length and further comprises a second header, the second header has a fixed length, the first header comprises header length information, and the step of generating the length information and the start position information of the payload generates the length information and the start position information of the payload according to the header length information.

9. The data decryption method according to claim 7, wherein the step of controlling the decryption calculation circuit to decrypt the payload by using the decryption key decrypts a part of the payload by a predetermined data length each time the payload is decrypted.

10. The data decryption method according to claim 9, the current encrypted data packet being adjacently followed by a next encrypted data packet, the method further comprising:
  when an unencrypted part of the payload is less than the predetermined length, controlling the decryption calculation circuit to generate and decrypt data to be decrypted matching the predetermined data length according to the payload of the current encrypted data packet, a payload of the next encrypted data packet and a start position information of the payload of the next encrypted data packet.

11. The data decryption method according to claim 7, wherein a decryption process of the decryption calculation circuit is compliant to HDCP specifications.

12. The data decryption method according to claim 7, wherein the encrypted data packet is a TS packet.

13. A data decryption circuit for decrypting a current encrypted data packet, the current encrypted data packet comprising a first header and a payload, the data decryption circuit
  configured to generate length information and start position information of the payload according to the first header through executing a program code and generate a control signal to trigger decryption; and
  comprising a decryption calculation circuit for generating a decryption key, retrieving the payload from the current encrypted data packet according to the start position information and the length information, and decrypting the payload with the decryption key,
  wherein a key formed by (a) first data according to the first header and a pseudo-random number and (b) second data according to a session key and a constant, the length information, position information, and the control signal to trigger decryption are sent to the decryption calculation circuit, and wherein the control signal to trigger decrypting is sent after the key, the length information, and the position information are sent.

14. The data decryption circuit according to claim 13, wherein when the current encrypted data packet has a fixed length and further comprises a second header, the second header has a fixed length, the first header comprises header length information, the data decryption circuit is configured to generate the length information and the start position information of the payload according to the header length information.

15. The data decryption circuit according to claim 13, wherein the decryption calculation circuit decrypts a part of the payload by a predetermined data length each time the calculation circuit decrypts the payload.

16. The data decryption circuit according to claim 15, wherein the current encrypted data packet is adjacently followed by a next encrypted data packet; when an unencrypted part of the payload is less than the predetermined length, the decryption calculation circuit generates and decrypts data to be decrypted matching the predetermined data length according to the payload of the current encrypted data packet, a payload of the next encrypted data packet and a start position information of the payload of the next encrypted data packet.

17. The data decryption circuit according to claim 13, wherein a decryption process of the decryption calculation circuit is compliant to HDCP specifications.

18. The data decryption circuit according to claim 13, wherein the encrypted data packet is a TS packet.

* * * * *